E. L. A. PAUMIER.
PHOTOGRAPHIC APPARATUS.
APPLICATION FILED MAR. 25, 1919.

1,413,187.

Patented Apr. 18, 1922.
2 SHEETS—SHEET 1.

Inventor:-
Emile Louis Albert Paumier
By Mauro, Cameron, Lewis & Massie
Attorneys

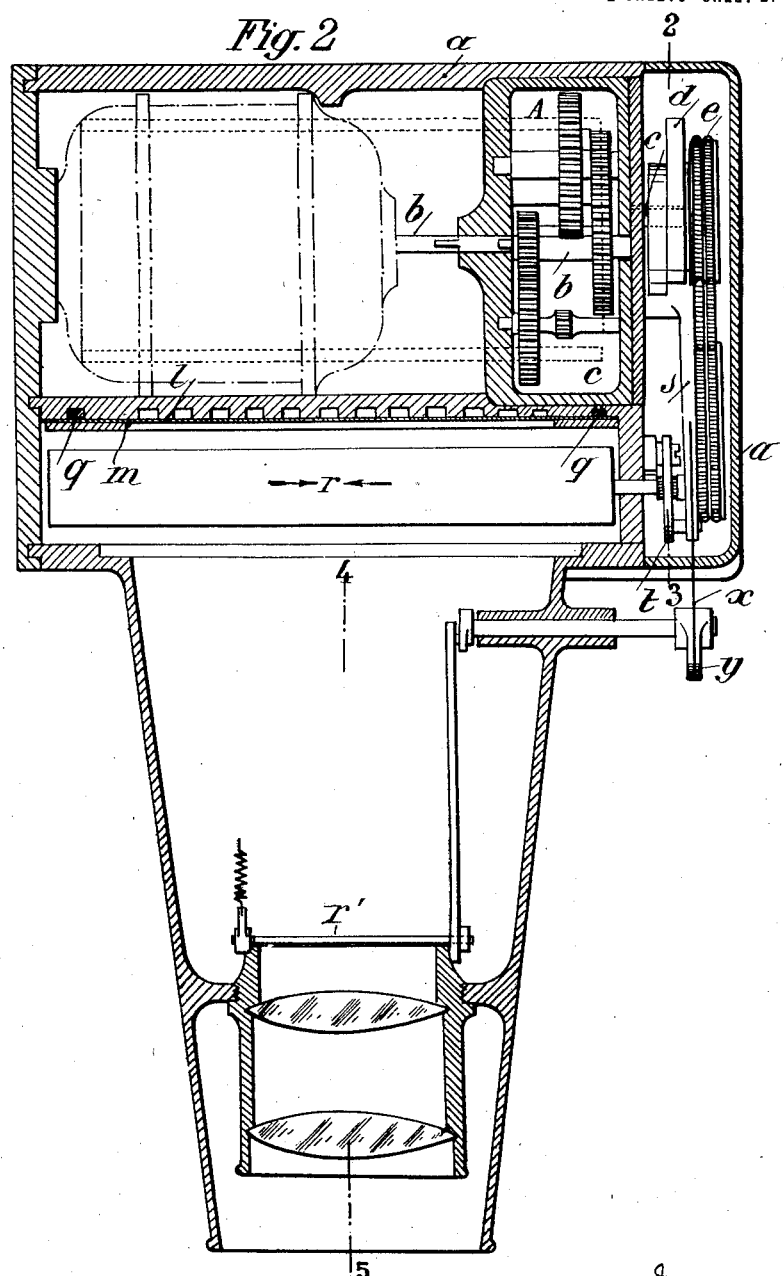

UNITED STATES PATENT OFFICE.

EMILE LOUIS ALBERT PAUMIER, OF PARIS, FRANCE.

PHOTOGRAPHIC APPARATUS.

1,413,187.  Specification of Letters Patent.  Patented Apr. 18, 1922.

Application filed March 25, 1919. Serial No. 285,085.

*To all whom it may concern:*

Be it known that I, EMILE LOUIS ALBERT PAUMIER, of 80 Avenue de la Muette, Paris, France, have invented new and useful Improvements in Photographic Apparatus, (for which I filed application for patent in France on February 18, 1918,) which improvements are fully set forth in the following specification.

This invention has for its object automatic photographic apparatus especially applicable for taking photographs on an aeroplane while in movement.

The main features of this apparatus are:

1. That the portion of the sensitized strip upon which the photograph is taken is perfectly flat;

2. That the sensitized strip is unrolled at a variable speed which should be as nearly as possible that of the displacement of the image of the object to be photographed and that consequently great clearness can be obtained.

3. That the electric control of the apparatus is effected by a motor which causes both the strip to be unwound and the setting and the release of the shutter.

The apparatus is illustrated diagrammatically in the accompanying drawings in which:

Fig. 2 is a section of the magazine on a plane at right angles to the trajecting of the aeroplane or on the line 1—1' of Fig. 1.

Figure 1:
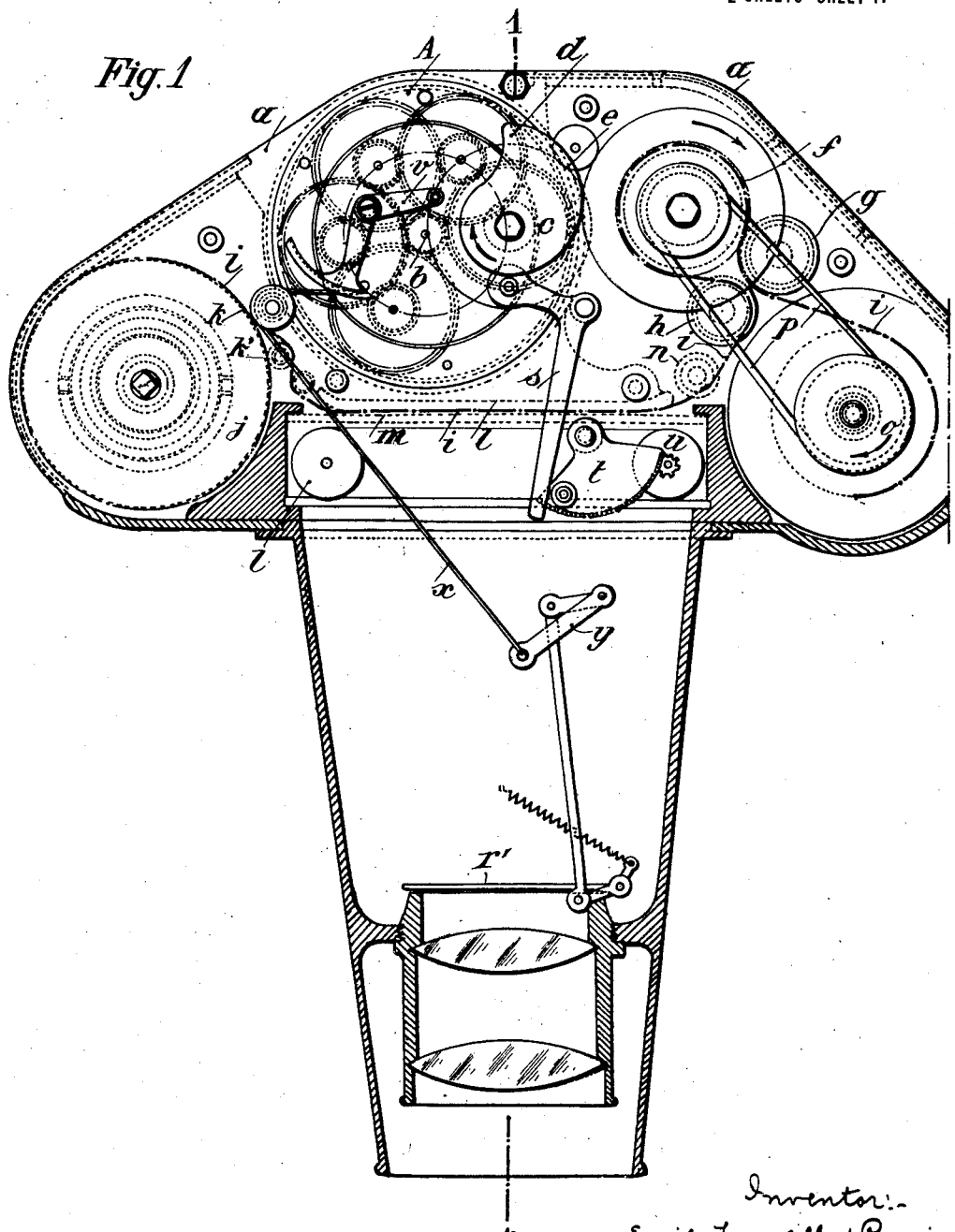
Fig. 1 is a section of the magazine of the apparatus on the line 2—3—4—5 of Fig. 2.

The automatic magazine is composed of a casing $a$ of suitable shape containing an electric motor shown in dotted outline in Fig. 2 of which $b$ is the shaft. This motor drives through speed reducing gear contained in a casing A, a main shaft $c$ carrying a cam $d$ (the use of which will be explained later) and a tooth wheel $e$ actuating a group of three cylinders $f, g, h$, which drive the strip $i$. The gear ratio between the tooth wheel $e$ and the wheel $f$ is such that for each turn of the main shaft the strip is driven a constant length having for value the length of a photograph increased by the space between two consecutive photographs. The strip $i$ is wound upon a reel $j$ whose movement of rotation is slightly braked to assume the proper tension of the strip.

The strip driven by the driving cylinders $f, g, h$, through friction passes from the magazine in which it unwinds over the guide cylinders $k, k'$, then between the guide grid $l$ and a piece of glass $m$ the two last having parallel faces. It will be seen that the film being pressed between two plane rigid surfaces must itself be kept flat.

The band is then guided by an auxiliary cylinder $n$ and is wound upon a receiving reel $o$ being driven by the cylinders $f, g, h$.

The receiving reel $o$ is itself driven at a suitable speed through the intermediary of a belt $p$ and a pulley of the receiving reel is frictionally mounted upon its shaft, in such a manner that the peripheral speed of the receiving reel may vary as the diameter is increased by the winding of the strip upon it. In order to avoid the unwinding of the reel caused by an accidental pull in the reverse direction the reel is provided with suitable pawl and ratchet means of known construction.

The speed reducing gear between the motor and the main shaft $c$ forms a compact group which can be changed as desired for another gear set, thus allowing the speed of the main shaft $c$ to be modified before the aeroplane starts on its journey.

The speed may moreover be modified before taking each set of photographs by acting upon the electric motor itself by means of a rheostat controlled by the operator.

The distance between the guide grid $l$ and the glass $m$ may be regulated with very great exactitude by means of calibrated wedges $q$.

The shutter $r$ is of the curtain type and is wound up by the action of the cam $d$ upc the bellcrank lever $s$ acting at each turn of the cam $d$ upon the toothed quadrant $t$ which at each turn causes the rotation of the pinion $u$.

The said cam $d$ acts upon another bell crank lever $v$ which through the intermediary of a cable $x$ causes at the desired moment (regulated by the suitable position of the levers $s$ and $v$ one with respect to the other and relatively to the cam $d$) a second shutter $r'$ of known construction to be released through the intermediary of the lever $y$. The profile of the cam and the position of the levers should be such as equally to distribute its functions over the whole duration of one revolution of the main shaft.

In place of the glass $m$ a metal plate of the same thickness forming a frame leaving an opening corresponding to the size of the photograph may in certain cases be employed.

Claim:

In apparatus for photographing from an aeroplane while in motion, the combination of a camera provided with an objective and intermittently actuated exposure mechanism, a continuously operating motor, and motor-driven mechanism for continuously moving a sensitive film across the objective at a speed approximately the same as the displacement of the image caused by the flight of the aeroplane, the film moving in the same direction as the image so that the film and image remain relatively stationary during an exposure.

In testimony whereof I have signed this specification.

EMILE LOUIS ALBERT PAUMIER.